(12) United States Patent
Ramachandra Rao et al.

(10) Patent No.: US 9,630,279 B2
(45) Date of Patent: Apr. 25, 2017

(54) METHOD OF MANUFACTURING WHEEL DISC

(75) Inventors: Badrinarayanan Ramachandra Rao, Chennai (IN); Sundararajan Thiagarajan, Chennai (IN); Rajaram Balaseshan, Chennai (IN)

(73) Assignee: WHEELS INDIA LIMITED, Padi, Chennai (IN)

( * ) Notice: Subject to any disclaimer, the term of this patent is extended or adjusted under 35 U.S.C. 154(b) by 25 days.

(21) Appl. No.: 14/006,193

(22) PCT Filed: Feb. 14, 2012

(86) PCT No.: PCT/IN2012/000101
§ 371 (c)(1),
(2), (4) Date: Sep. 19, 2013

(87) PCT Pub. No.: WO2012/127491
PCT Pub. Date: Sep. 27, 2012

(65) Prior Publication Data
US 2014/0007431 A1    Jan. 9, 2014

(30) Foreign Application Priority Data
Mar. 24, 2011  (IN) .............. 904/CHE/2011

(51) Int. Cl.
*B21D 22/16* (2006.01)
*B23P 15/00* (2006.01)
*B21D 53/26* (2006.01)
*B21H 1/02* (2006.01)
*B21K 1/28* (2006.01)

(52) U.S. Cl.
CPC .............. *B23P 15/00* (2013.01); *B21D 22/16* (2013.01); *B21D 53/265* (2013.01); *B21H 1/02* (2013.01); *B21K 1/28* (2013.01); *Y10T 29/49496* (2015.01)

(58) Field of Classification Search
CPC ....... B23P 15/00; B21D 53/265; B21D 22/16; B21D 53/16; B21D 53/18; B21D 53/30; B21D 22/14; B21D 53/26; B21D 53/268; B21H 1/02; B21K 1/28; B21K 1/32; B21K 1/38; Y10T 29/49501; Y10T 29/5116; Y10T 29/49524; Y10T 29/49529; Y10T 29/49504
USPC ...................................... 29/894.32
See application file for complete search history.

(56) References Cited

U.S. PATENT DOCUMENTS

| | | | | |
|---|---|---|---|---|
| 2,359,479 A * | 10/1944 | Ingersoll | ............... | 29/894.325 |
| 2,983,033 A * | 5/1961 | Cox | ................... | 29/894.325 |
| 3,255,518 A * | 6/1966 | Golata | ................ | 29/894.353 |
| 3,438,111 A * | 4/1969 | Wilcox | ............... | 29/894.353 |
| 5,345,676 A * | 9/1994 | Ashley, Jr. | ........... | 29/894.323 |
| 5,579,578 A * | 12/1996 | Ashley, Jr. | ........... | 29/894.322 |

(Continued)

*Primary Examiner* — David Bryant
*Assistant Examiner* — Lawrence Averick

(57) ABSTRACT

In view of the foregoing, an embodiment herein provides a method of manufacturing wheel disc, wherein said method comprising of steps providing a rectangular strip made of metallic materials, circling the strip to form a band, welding the band to form a hoop by welding process, forming one side of the hoop to make the center portion of the disc, spinning another side of the hoop to form flange of the disc, and achieving varying thickness across the disc to make variable thickness wherever needed, thereby reducing the usage of raw material and reducing wastage and making light weight wheel disc.

3 Claims, 5 Drawing Sheets

(56) References Cited

U.S. PATENT DOCUMENTS

| | | | |
|---|---|---|---|
| 7,523,554 B2* | 4/2009 | Kimura et al. | 29/894.353 |
| 2003/0217466 A1* | 11/2003 | Coleman | 29/894.32 |
| 2004/0244197 A1* | 12/2004 | Takeda | B21D 53/26 |
| | | | 29/894.322 |
| 2005/0178005 A1* | 8/2005 | Mitsuyoshi et al. | 29/894.35 |
| 2010/0269346 A1* | 10/2010 | Wolf et al. | 29/894.322 |

* cited by examiner

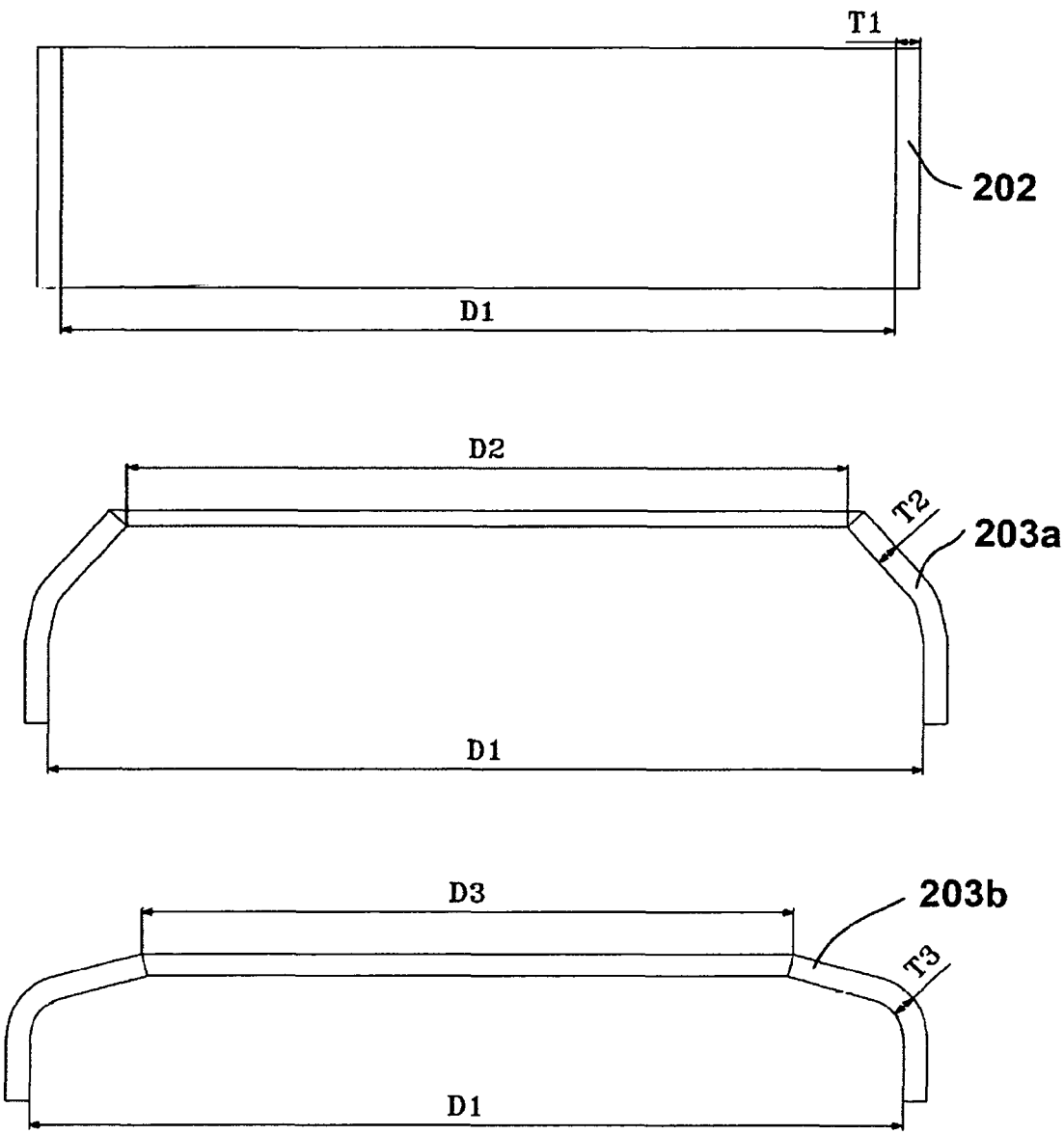
Fig. 4.1

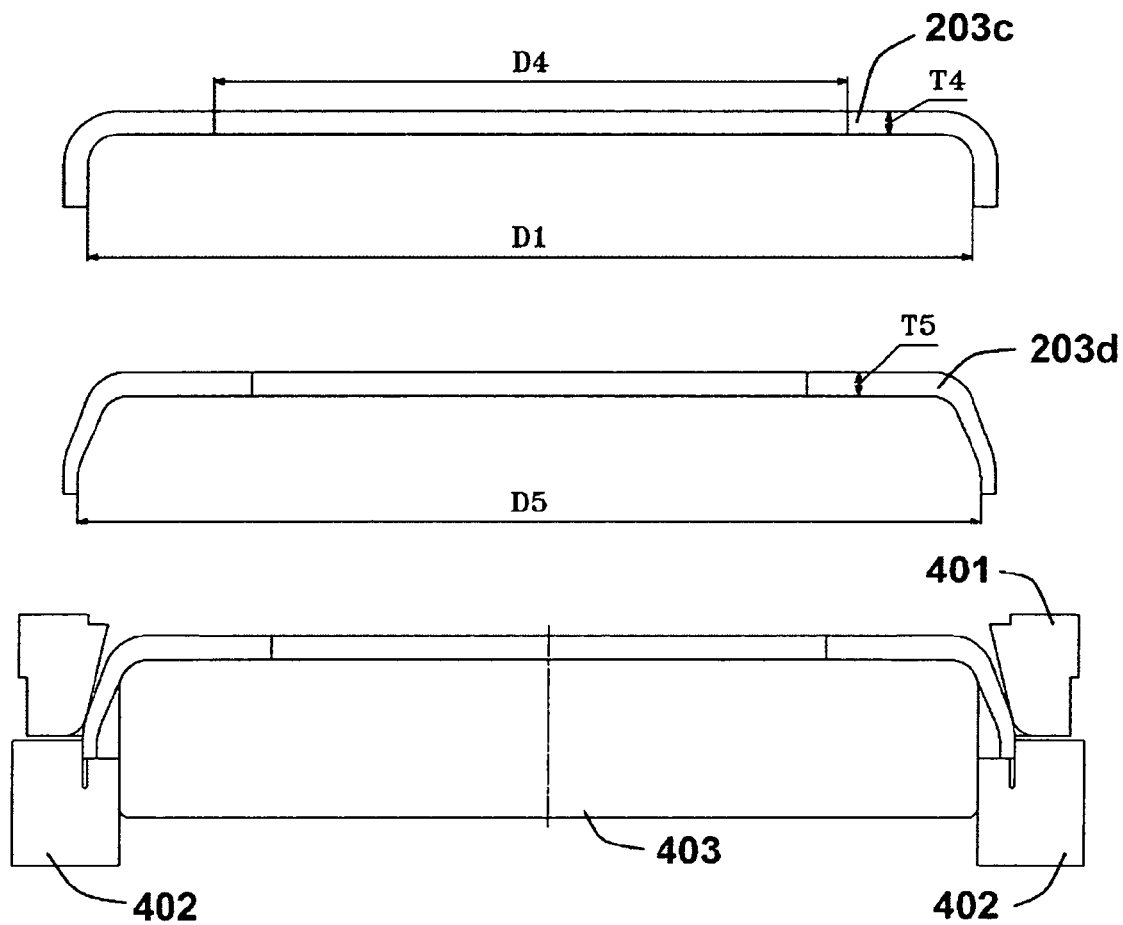
Fig. 4.2

METHOD OF MANUFACTURING WHEEL DISC

FIELD OF INVENTION

The embodiments herein generally relate to the field of automobile wheels industry, more particularly, to a novel method of manufacturing wheel disc, wherein the total raw material required to make the disc is substantially less, and also to enhance the performance of the wheel.

BACKGROUND AND PRIOR ART

Wheels are not only critical to safety in the use of an automotive vehicle, but also have an effect on vehicle stability and driving comfort.

A wheel has three main parts—hubs, spokes and rim. The hub is the center portion of the wheel, the spokes radiate from the hub to the rim, and the rim is the outer part on which the tire gets mounted. Accordingly, wheels can be one-piece, two-piece or three-piece in construction. In automobiles usage however, the nomenclature wheel parts can be segmented into rims and disc.

To maintain a reasonable cost of production as well as the necessary strength of the wheels, the parts are generally made of steel/aluminum alloys. However, wheels have an effect on the efficiency of a vehicle's performance—the greater the mass of the wheels, more energy must be imparted on the wheels to accelerate the vehicle. In order to make the wheel lighter, strength of the material is increased in raw material and/or by process.

There are different ways of making the rims and wheel discs. Usually, in the conventional method of making the wheel, the rim and discs are manufactured separately and welded together.

The most common method of making discs is using the stamping process, wherein the circular blank is cut out from a rectangular plate. After pressing to the required shape, the center portion of the material is pierced away to facilitate the mounting the wheel on the vehicle. In this process of disc making, an account of using a strip of predetermined size, substantial portion is taken away as design/engineering wastage.

Also, it must be kept in mind that typically the wheel exhibits difference in the stress pattern across the section. In the stamping process, the disc' cross section has the same thickness.

To achieve the variation in the thickness of the part, the flow forming process is followed. Though flow forming process helps to yield better wheel with reduced weight, it could not avoid the above said design/engineering wastage made during the manufacturing (stamping) process.

Therefore, there is a need in the art to provide a method of manufacturing disc which can reduce the usage of raw material, resulting in substantially less design/engineering wastage as compared to the conventional stamping process. Further, the process would enable usage of lower grade raw material that would improve the strength when manufactured into the final product.

OBJECTS OF THE INVENTION

A main object of the invention is to provide a novel method of manufacturing wheel disc.

Another object of the invention is to provide a method of manufacturing disc, which can reduce the raw material usage substantially.

Still another object of the invention is to provide a method of manufacturing disc, which can result in reduction of design/engineering wastage.

Yet another object of the invention is to provide a method of manufacturing disc, wherein lower grade material can be used as raw material.

Another object of the invention is to provide a disc with varying thickness there by thickness is reduced where the stresses are lower resulting in use of lesser material input.

Another object of the invention is to enhance the performance of the wheel keeping the wheel weight lower.

Another object of the invention is to impart high strength in disc wherever it required through the process.

Another object of the invention is to have optimal contact with the mating surface (Improving the contact area by taper profile of the disc) there by enhancing the wheel life.

The other objects and advantages of the present invention will be apparent from the following description when read in conjunction with the accompanying drawings which are incorporated for illustration of preferred embodiments of the present invention and are not intended to limit the scope thereof.

SUMMARY OF THE INVENTION

In view of the foregoing, an embodiment herein provides a method of manufacturing wheel disc, wherein said method comprising the step of providing a rectangular strip made of metallic materials, circling the strip to form a band, welding the band to form a hoop, wherein the welding can be any resistance/arc/friction stir welding process, forming the hoop such that one side of the hoop becomes the centre portion of the disc, and other side of the hoop is spun to make flange portion of the disc. The step of forming the hoop comprises of subjecting the one side of hoop to necking process to bend one side at an angle in the range of 40° to 45°, subjecting the bended side of hoop to necking process to further bend at an angle in the range of 72° to 76, and subjecting the further bended side of hoop to necking process to extend bend at an angle of 90°. During the process, varying thickness is achieved across the cross section of the disc by spinning process and thereby reducing the usage of raw material and reducing design/engineering wastage and making the wheel disc lighter. Further, the present method will enable the manufacturer to manufacture the wheel disc by using lower grade material such that the process enhances the strength of the wheel disc.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 4.1 illustrates the initial steps involved in manufacturing wheel disc, according to an embodiment of the present invention; and FIG. 4.2 illustrates the last steps involved in manufacturing wheel disc, according to an embodiment of the present invention.

DETAILED DESCRIPTION OF THE PREFERRED EMBODIMENTS

Figure 1:
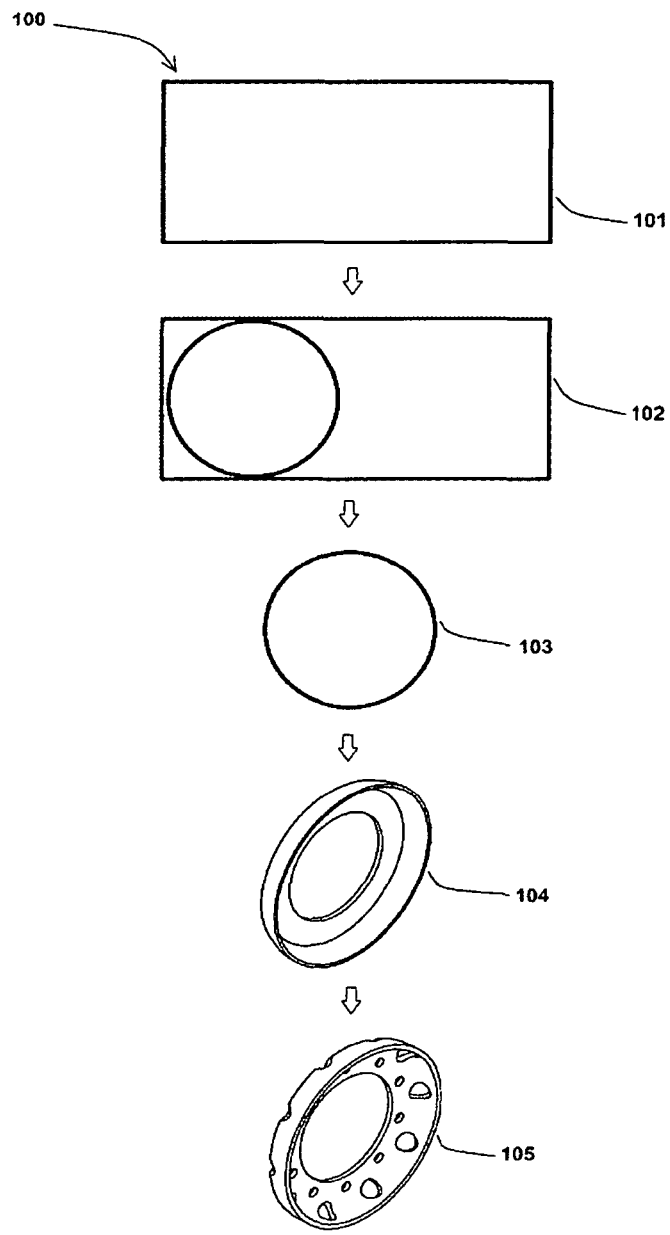
FIG. 1 illustrates conventional method of manufacturing wheel disc.
Figure 2:
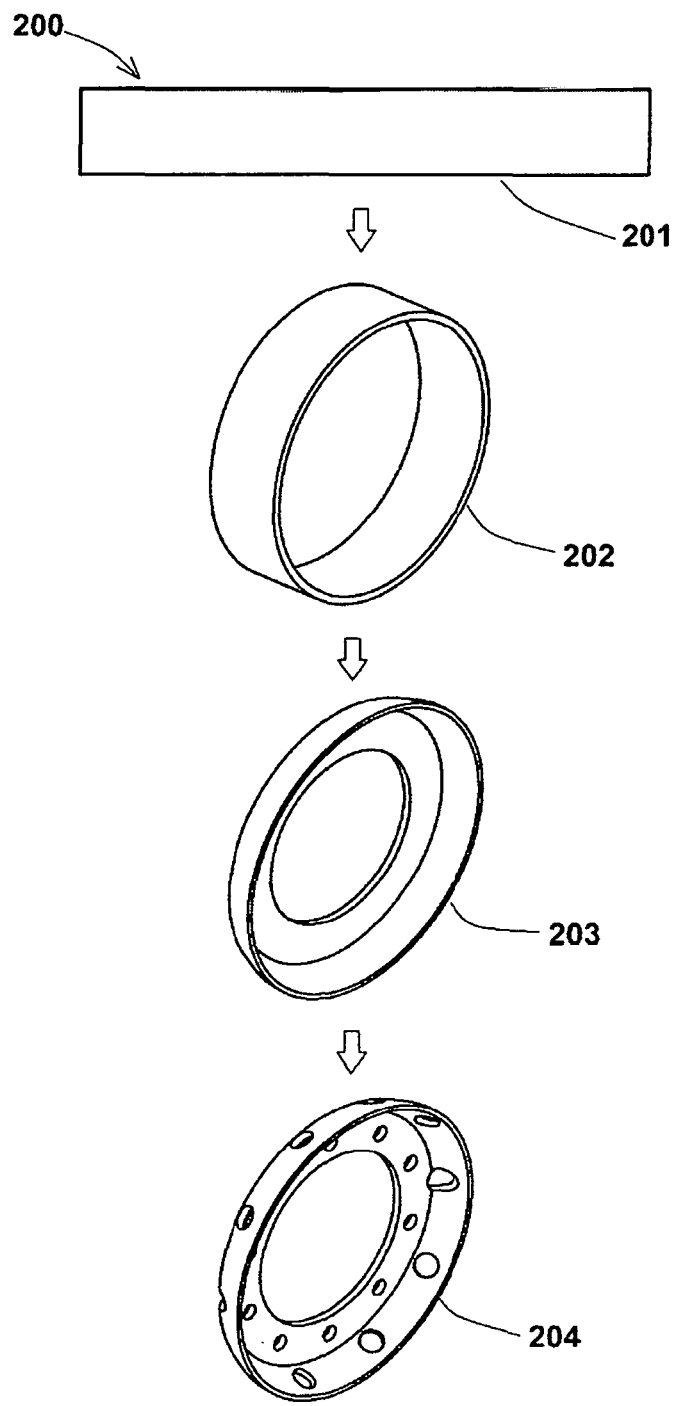
FIG. 2 illustrates a novel method of manufacturing wheel disc, according to embodiment of the present invention.
Figure 3:
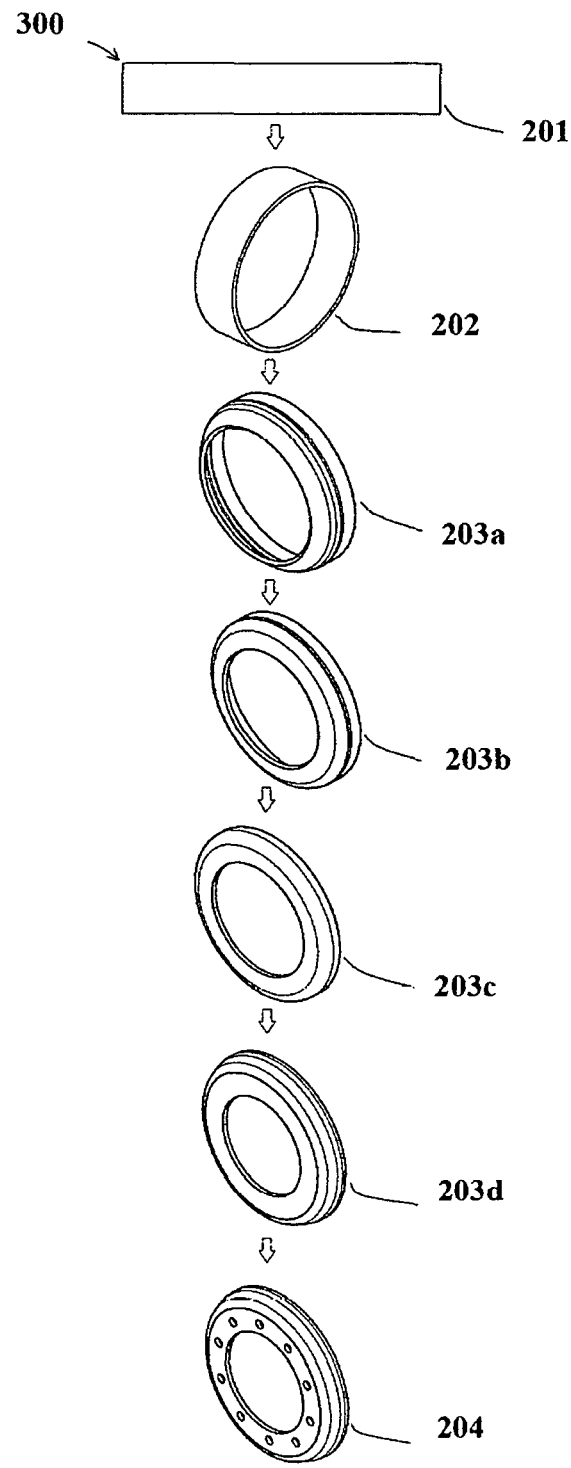
FIG. 3 illustrates a novel method of manufacturing wheel disc, according to preferred embodiment of the present invention.

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein As mentioned earlier, there is a need for providing a method of manufacturing wheel disc produced with substantially lower input material, lower weight and high strength on the finished product. The embodiments herein achieve this by providing a novel method of manufacturing wheel disc along with variable thickness of disc to impart the high strength at the required place. Referring now to the drawings, more particularly to FIGS. 1 through 3, where similar reference characters denote corresponding features consistently throughout the figures, there are shown preferred embodiments.

Now referring to FIG. 1, the process 100 of manufacturing wheel disc in accordance with conventional method is illustrated. First, a rectangular strip 101 is provided for making one or more blank, wherein the blank is circular and cut 102 out from the rectangular strip 101 at predetermined diameter by using the pressing step. The blank 103 is further processed, the step 104 of forming to create flange at one side of the disc. After formation of flange at outer side of blank, the centre portion of the blank is pierced away 105 to create a hollow space at the center to facilitate the wheel mounting on the vehicle. Therefore, substantial portion of rectangular is wasted due to that portion taken away as design/engineering wastage.

According to an embodiment of the present invention, the process 200 of manufacturing wheel disc is illustrated in FIG. 2. Accordingly, a rectangular strip 201 made of metal alloys at predetermined thickness is provided. Then, the strip is cylindrically circled to form a band, and both the edges of band are welded together to form a hoop 202, according to an embodiment. The welding can be performed by any resistance/arc/friction stir welding process. Further, in an embodiment, one side of the hoop is formed 203 to make the centre portion of the disc, and another side of the hoop is spun to form flange of the disc. In a preferred embodiment, varying thickness across the section of the disc to achieve desired thickness is performed by suing spinning process. According to an embodiment of present invention, the spinning process includes shaping an optimal contact surface at the nave portion [centre portion of the disc] and flange region to achieve required contour and thickness.

According to preferred embodiment of the present invention, the method 300 of manufacturing wheel disc is illustrated in FIG. 3. A rectangular strip 201 made of metal alloys at predetermined thickness is provided, according to an embodiment. The thickness of the strip can be selected based on the types of vehicles for example it can be in the range of 5-20 mm. The strip is cylindrically circled to form a band, and the diameter of the band can be varied to obtain the required thickness and maintaining the same thickness across the band. Further, the edges of the band are welded together to form a hoop 202, subsequently the welded portion is trimmed to smooth outer surface of weld portion.

In accordance with one embodiment, the hoop is formed 203 to obtain the wheel disc, wherein the forming step 203 includes subjecting one side of the hoop to one or more necking process to achieve the desired shape of wheel disc. Accordingly, the one side of hoop is subjected to first necking process to achieve bend portion 203a at the one side of hoop at an angle in range of 30° to 50°. Further, the bended portion 203a of hoop is further subjected to another necking process to achieve further bend portion 203b of the hoop at an angle in the range of an angle of 60° to 80°. Thereafter, the further bend portion 203b of hoop is again subjected to yet another necking process to achieve extended bend portion [also referred as flat/centre portion] 203c of the hoop at an angle of 90°, thereby resulting to form centre portion of the disc. In an embodiment, both centre portion and outer end of the hoop is subjected to spinning process 203d to make nave and flange portion at required thickness, respectively.

According to an embodiment of the present invention, the necking process includes the step of bending the material to required form. During necking process the material gets consolidated at the necked region which in turn results in higher thickness than the initial thickness of band/hoop at the necked region. Such increase in the thickness at the necked region can also be referred herein as thickening process. The necking process can be performed by using a hydraulic/mechanical press. Accordingly, the necking process enables the wheel disc to have increased thickness and strength.

Now referring to FIG. 4, the various steps 400 involved in manufacturing the disc is illustrated, according to an embodiment. Accordingly, the band/hoop 202 is placed over the hydraulic press for subjecting one side of the hoop to one or more necking process. Another side of the hoop is placed in-between the supporting ring 403 to securely hold the hoop. In an embodiment, under/inside the hoop, a punch 403 is provided to achieve the desired shape of the disc, and die mechanism 401 is provided for subjecting one side of the hoop to necking step to achieve centre portion of the disc.

Accordingly, the initial thickness T1 of the hoop 202 is selected to have desired thickness and shape of the disc. After subjecting to first necking step, the one side of the hoop 202 is bended at angle in the range of 30° to 50° to form a bend portion 203a, and during the first necking step, the thickness of the bend portion 203a increases from T1 to T2, and the diameter of the bending portion decreases from D1 to D2, wherein the diameter D1 of another side of the hoop remains constant. Subsequent to the first necking step, the bend portion 203a is subjected to second necking step to form further bend portion 203b having angle in the range of 30° to 50°, where in the thickness of the further bend portion 203b increases from T2 to T3, and the diameter of the further bend portion decreases from D2 to D3 during second necking step, but at the same time the diameter D1 of another side of the hoop remains constant. Further, the hoop is subjected to third necking step to form extended bend portion 203c [flat/centre portion] of the disc, where in the thickness of the further bend portion 203b increases from T3 to T4, and the diameter of the further bend portion decreases from D3 to D4 during second necking step, but at the same time the diameter D1 of another side of the hoop remains constant. Accordingly, the thickness of the hoop varies as shown below (1) during the necking steps.

$$T1<T2<T3<T4 \qquad (1)$$

Further, the diameter of the bending portions to form final centre portion varies as shown below (2) during the necking steps.

$$D1>D2>D3>D4 \qquad (2)$$

The centre portion 203c of the disc is subjected to spinning process 203d to achieve make the required thickness T5 across the centre portion to form nave of the disc, according to an embodiment. After spinning the centre portion 203c, the thickness is reduced from T4 to T5 as shown below (3), wherein the thickness T5 can also be varied within the centre portion 203c of the disc by using spinning process.

$$T5<T4 \qquad (3)$$

In an embodiment, the diameter D1 of another side of the hoop remains constant during the necking steps. The another side of the hoop is subjected to spinning process to flange portion of the disc and to increase the diameter from D1 to D2, and the thickness of the flange region is reduced to required level during the spinning process.

$$D1<D2 \qquad (4)$$

Accordingly, the main advantage of the invention is reducing the usage of raw material and reducing design/engineering wastage thereby making light weight wheel disc.

Another advantage of the present invention is enabling to form and shape the disc part of the wheel from a hoop, amenable to mass manufacturing that allows to optimize section thickness of the wheel disc in order to enhance the performance of the wheel. Further, the present method imparts higher strength in disc wherever required.

The present method of manufacturing the wheel disc would enable use of lower grade input material.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method of manufacturing wheel disc comprising the steps of:
    providing a rectangular strip made of metallic material;
    circling the strip to form a band;
    welding the band to form a hoop;
    forming one side of the hoop to make centre portion of the wheel disc;
    spinning another side of the hoop to make a flange portion of the wheel disc; wherein an inner diameter of said another side of the hoop is constant during the forming step;
    wherein said forming step comprising the step of subjecting one side of hoop to more than one necking process with predetermined angles to achieve desired shape and desired thickness of wheel disc;
    wherein said one side of the hoop is subjected to first necking process to form a bend portion at an angle in the range of 30° to 50°;
    wherein said bend portion of the hoop is subjected to another necking process to form further bend position at an angle in the range of 60° to 80°;
    wherein said further bend portion of the hoop is subjected to yet another necking process to form an extended bend portion at an angle of 90° to achieve desired shape of wheel disc; and
    wherein thickness of said one side of the hoop increases and diameter of said one side of hoop decreases during each necking process, wherein diameter of said another side of the hoop portion remains constant during each necking process.

2. The method of manufacturing wheel disc of claim 1, wherein said centre portion of the disc is subjected to spinning process to achieve required thickness across the centre portion to form nave of the disc, and the another side of the hoop is subjected to spinning process to form flange portion of the disc and to increase in diameter of the another side of the hoop portion, and the thickness of the flange region is reduced to required level.

3. The method of manufacturing wheel disc of claim 1, wherein after spinning the centre portion, the thickness of the bend portion is reduced and varied within the centre portion of the disc.

* * * * *